MAGNETIC CORE CIRCUITS FOR BINARY CODED INFORMATION HANDLING

Filed July 15, 1957 3 Sheets-Sheet 1

Inventors
Francois H. Raymond
Andre M. Richard
Alice M. Recoque
Jean Brodin
By Ralph B. Stewart
attorney

MAGNETIC CORE CIRCUITS FOR BINARY CODED INFORMATION HANDLING

Filed July 15, 1957 3 Sheets-Sheet 2

Inventors
Francois H. Raymond
Andre M. Richard
Alice M. Recoque
Jean Brodin
By Ralph B. Stewart
Attorney

MAGNETIC CORE CIRCUITS FOR BINARY CODED INFORMATION HANDLING

Filed July 15, 1957 3 Sheets-Sheet 3

Inventors
Francois H. Raymond
Andre M. Richard
Alice M. Recoque
Jean Brodin
By Ralph B. Stewart
Attorney

United States Patent Office 3,058,098

Patented Oct. 9, 1962

3,058,098

MAGNETIC CORE CIRCUITS FOR BINARY CODED INFORMATION HANDLING

Francois Henri Raymond, Saint-Germain-en-Laye, Andre Michel Richard, Paris, Alice Maria Recoque, Sartrouville, and Jean Brodin, Bourg-la-Reine, France, assignors to Societe d'Electronique et d'Automatisme, Courbevoie, France Filed July 15, 1957, Ser. No. 671,854
Claims priority, application France July 21, 1956
11 Claims. (Cl. 340—174)

The present invention is concerned with improvements in or relating to magnetic core circuits for handling binary coded informations through temporary registrations of the digits thereof on the said cores and repeatedly controlled progressions of these registrations along at least one cascade arrangement of the said cores in the said circuits. Usually, each core is made of a material which presents a substantially rectangular hysteresis cycle so that two stable conditions of reverse states of magnetization may be obtained and may serve for the representation of the binary digital values 0 and 1, according to a predetermined correspondence established between the said two states of magnetization and the said two digital values. As will be apparent later on, the said correspondence may vary according to a known law throughout the said cascade arrangement of magnetic cores. Each core is provided with at least one write-in winding and one read-out winding and interconnecting networks are provided between write-in windings and read-out windings of the cores for obtaining the said cascade arrangement along which a progression of a binary code may be suitably controlled. Each write-in winding of a core may receive a write-in current which, when of a special character with respect to the previous state of magnetization of the concerned core, may change this state of magnetization. Each read-out winding may carry a current which is of a character representative of the state of magnetization previously acquired by the concerned core.

The present invention is mainly concerned with an improved arrangement of interconnecting networks in a magnetic core circuit of the above-specified kind for a more simple and efficient control of the handling of binary coded informations therewith.

According to a feature of the invention, in a magnetic core circuit of the above-specified kind, each interconnecting network is active and comprises a pair of terminals for the application thereto of a two-polarity waveform control voltage, at least one read-out winding of a magnetic core with one end thereof connected to one of the said terminals, at least one write-in winding of a further magnetic core with one end thereof connected to the other one of the said terminals, the number of turns of the said write-in winding being lower than the number of turns of the said read-out winding, and a unidirectionally conducting element completing a serial connection between the said two windings and the said pair of terminals, all the unidirectionally conducting elements being of the same direction of insertion in the said interconnecting networks but the said control voltages being of regularly opposed phases in the application thereof to the successive interconnecting networks of the said magnetic core circuit.

This and other features of the invention will now be detailed with reference to the accompanying drawings, wherein.

Figure 4:
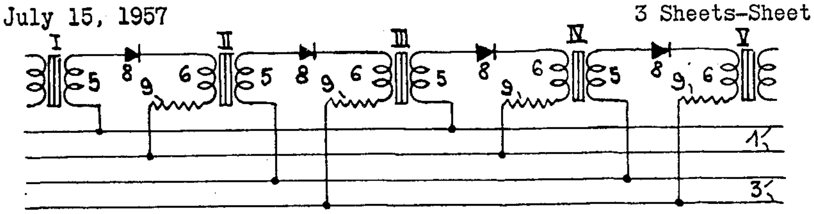
Figure 5:
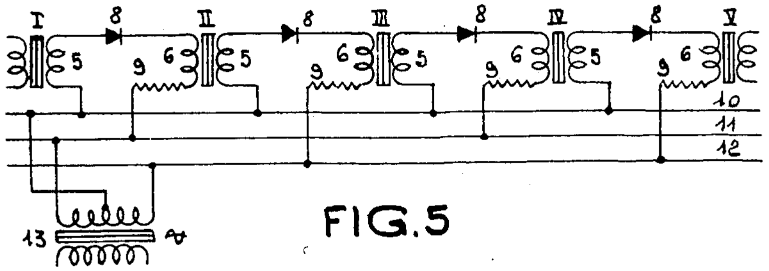
Figure 6:
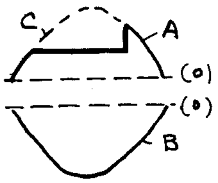
Figure 7:
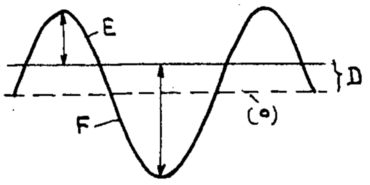
Figure 8:
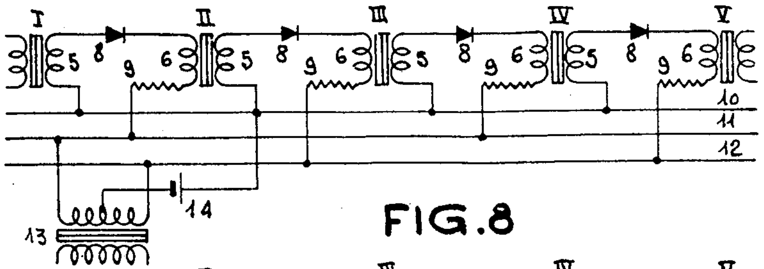
Figure 9:
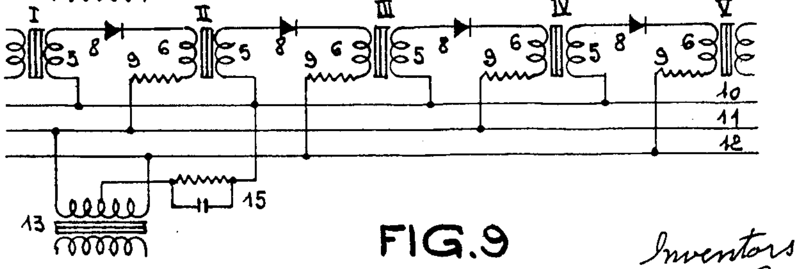
Figure 10:
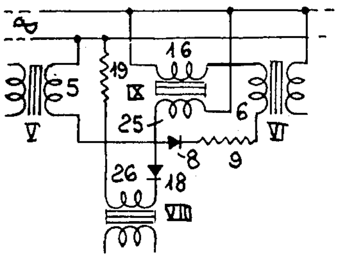
Figure 11:
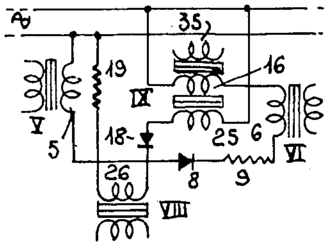
Figure 12:
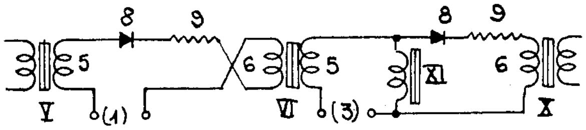

FIGS. 4 and 5 respectively show two illustrative embodiments of magnetic core circuits according to the invention;

FIGS. 6 and 7 show graphs for explaining certain drawbacks of the embodiments of FIGS. 4 and 5;

FIGS. 8 and 9 show two examples of magnetic core circuits wherein the said drawbacks are overcome;

FIG. 10 shows the manner whereby a derivation may be made in the preceding magnetic core circuits;

FIG. 11 shows the manner for performing certain logical operations with a circuit of the kind of that of FIG. 10;

FIG. 12 shows a special kind of transfer circuit for insertion in the previously described embodiments, specially for performing logical operations between distinct informations, as then shown, in an illustrative fashion in FIGS. 13 to 16, inclusive.

In these figures as far as possible similar reference characters are applied to corresponding elements.

Figure 1:
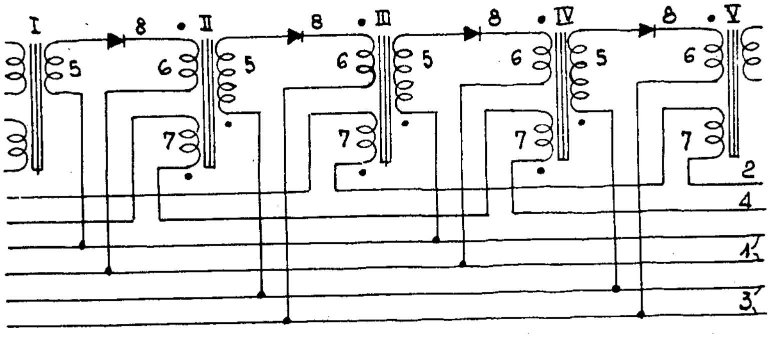
FIG. 1 shows a magnetic core circuit of the type with which the invention is concerned.

FIG. 1 shows a part of a cascade arrangement comprising five magnetic cores, I to V, each one of which is made of a material having a substantially rectangular hysteresis cycle. Each core is provided, in this embodiment, with three windings viz. a write-in winding 6, a read-out winding 5 and a special winding 7. The write-in or input winding 6 is for instance of $n_2$ turns and the read-out or output winding 5, of $n_1$ turns, with $n_2$ lower than $n_1$. The winding 7 will be used as a resetting winding though it will be later disclosed how and in what conditions such a control winding may be dispensed with.

The digital value 1 will be represented by a definite condition, $A_1$, of a magnetic core whereas the digital value 0 will be represented by the reverse condition, $A_0$. With respect to the embodiment of FIG. 1, it will be assumed that the condition $A_1$ will be the positive remanent induction state, P, of a core, and the condition $A_0$ consequently, the negative remanent induction state, N, of a core, though of course the reverse may be considered as well.

Each read-out winding 5 of a magnetic core is serially connected with the write-in winding 6 of the next following core in the sequence and this serial connection includes a unidirectionally conducting element 8 and a voltage source. The point of insertion of the element 8 in the said serial connection may be at any desired location.

The voltage terminals of the networks interconnecting the cores I—II, and III—IV, are branched off leads from circuit 1 supplying a first two-polarity waveform voltage, and the voltage terminals of the networks interconnecting the cores II—III, and IV—V, are branched off leads from circuit 3 supplying a second two-polarity waveform voltage.

The control windings 7 of alternate cores, such as the cores II and IV are serially connected in a current circuit 4, and the windings 7 of the remaining cores III and V are serially connected in a current circuit 2. Of course, the winding 7 of the first core I is in the current circuit 2, though it is not shown.

Figure 3:
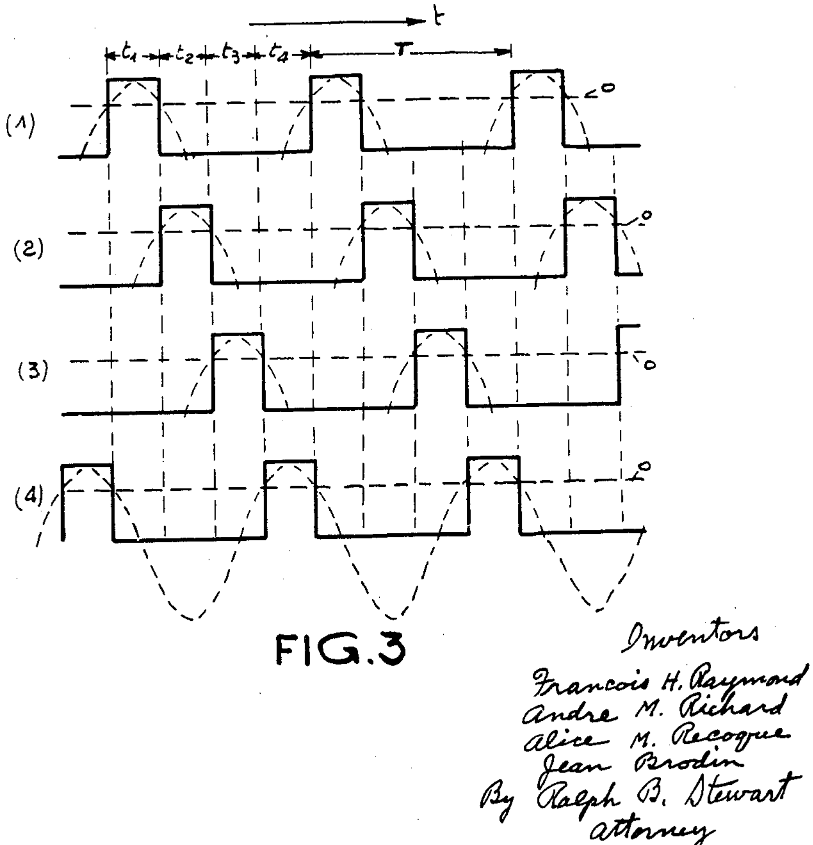

The voltage and current waveforms supplied by circuits 1 to 4 may be such as shown in FIG. 3, references (1) to (4). In any case, they are of two polarity and may be pure A.C. waveforms as indicated in dot lines. Lines marked 0 define the threshold level of action of the said waveforms in their positive actions upon the cores. It is more apparent when considering pure A.C. waveforms that (1) and (3) are in relative phase opposition therebetween and that (2) and (4) are in phase opposition therebetween, though a phaseshift of 90° exists between the pair (1), (3) and the pair (2), (4). The said currents and voltages act in four distinct sub-periods $t_1$, $t_2$, $t_3$ and $t_4$, constituting together the recurrence period T of operation of the device.

For explaining the operation of the arrangement of FIG. 1, it will be assumed that it starts from a time instant when cores I and III record the digital value 1 and cores II, IV and V, the digital value 0. Cores I and III are in their P magnetic condition, cores II, IV and V in their N condition.

On each core, windings 6 and 7 are wound in opposite directions.

Core II has just been reset to its N condition by the positive alternation of current waveform (4) of FIG. 3, on the extreme left-hand side. The same alternation had no effect on core IV since, as core V is in the N condition, core IV has previously remained in the said N magnetic condition.

Starting with the sub-period $t_1$ of FIG. 3, the voltage applied across 1, and consequently across the terminals of interconnecting networks between cores I—II, and cores III—IV, finds a substantially negligible impedance path offered to the development of transfer electrical current in each one of the windings 5 of cores I and III because the positive alternation of voltage (1) during $t_1$ brought these cores over their P condition to an oversaturated magnetic condition. Such a phenomenon of negligible impedance is quite known per se.

The value of the current, established in a direction such that it is transmitted through diodes 8 in these interconnecting circuits, is then solely determined by the impedance of the windings 6 of the receiver cores therein. This current value is, for instance $i_c/n_2$ with $i_c$ the single-turn coercive current of any core and $n_2$, as said, the number of turns of any winding 6. It then actuates cores II and IV for changing their magnetic condition from N to P during this time interval $t_1$. At the end of such interval, all cores I to IV, inclusively, are in their P condition.

Figure 2:
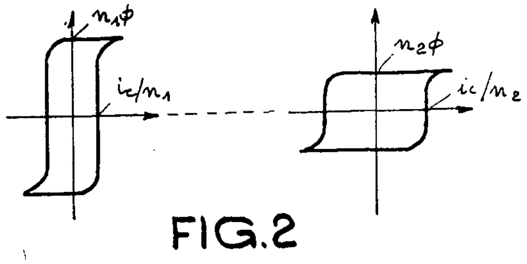
FIGS. 2 and 3 show graphs for explaining the operation of the device of FIG. 1.

The cycle covered by the magnetic change of flux during $t_1$ in cores II and IV is shown in the right-hand part of FIG. 2.

As soon as a current starts to pass through the windings 5 of cores I and III, a magnetization effect tends to develop in these cores, but this effect is opposed by the action of the current (4) in the windings 7 thereof, and further this effect would have been only that of a smaller current $i_c/n_1$, where the number of turns $n_1$ of a winding 5 being, as said, several times greater than $n_2$. The security of operation is thus ensured.

Then occurs a period $t_2$ during which the current through the windings 7 of cores I and III, as shown at (2) in FIG. 3, acts for resetting both the cores I and III to their N magnetic condition. The unidirectionally conducting elements or diodes 8 which passed the first currents for the transfer of magnetic conditions from I to II and from III to IV do not pass the current induced by the resetting of cores I and III in their windings 5. At the end of $t_2$, cores I and III are in their N condition, cores II and IV are in their P condition. The registration has progressed by one step along the circuit.

During the third sub-period, $t_3$, it is the interconnecting networks between cores II—III and cores IV—V which receive a suitable alternation from the supply leads (3), see FIG. 3, for enabling the passage of current through the diodes 8 of their interconnecting networks for the actuation of cores III and V from their N to their P conditions. The transfer is effected under the same conditions as for the transfer during $t_1$, but with a shift of cores. Consequently, at the end of sub-period $t_3$, cores II, III, IV and V are all in their P condition.

During $t_3$, core I may have received or not an information bit of value 1. Suppose it has not, so this core I has remained in its N condition.

During $t_4$, cores II and IV are reset to their N condition, as was the case for I and II during $t_2$. Within each overall period T, obviously, each digit of the information has progressed by an effective step, the digit standing on core I at the beginning standing now on core III and the digit standing on core III at the beginning standing now on core V, the registration of each one of the digits obviously needing a pair of cores for correct representation and progression.

In a new period T, the first sub-period $t_1$ will bring core IV to the P condition and during sub-period $t_2$, core III will be reset to N. During $t_1$ core II will remain at the N condition as the current induced by the positive alternation of the voltage (1) in the windings 5 and 6 in the interconnecting circuit between I and II will be limited to a lower value since the impedance of 5 is not then negligible as this current tends to desaturate the core I: and so forth.

During the resetting periods, the current is $i_c/n_1$ as shown in the left-hand part of FIG. 2.

The arrangement shown in FIGURE 1 is being claimed in a separate copending application.

The resetting may advantageously be avoided and the diagram of the circuit simplified when the windings 7, and consequently the control currents therefor are omitted.

In such a case, the resetting of the cores must be ensured from the reading-out currents proper and this will be automatically obtained with a suitable number of turns of the read-out windings 5 of the cores. Reference is made for a straight-through modification to the diagram of FIG. 4, wherein further a resistor 9 has been shown, serially inserted in each interconnecting network for damping any oscillation which may tend to be initiated therein in each transfer period thereof. Such a series resistor may also be used, though at a lesser degree of usefulness in any interconnecting network of FIG. 1. In a circuit such as shown in FIG. 4, the voltage applied to an interconnecting network for reading out the magnetic condition of a core produces therein a current which resets or not the read out core as the case may be. If the core is reset before the end of the "alternation" of the reading out voltage, an excess of current may occur in the network and in this respect also the resistor 9 is useful for absorbing the excess part of the said current. As only voltage waveforms (1) and (3) of FIG. 3 are then provided, the supply of the magnetic core circuit may then be arranged as shown in FIG. 5 that is to say that the A.C. voltage (which may advantageously then be purely sinusoidal for the sake of simplicity) may be applied to the interconnecting networks from the secondary winding of a supply transformer 13 the said secondary winding of which of which is tapped at the mid-point thereof. One end of all the similar function windings, 5 for instance, of the interconnecting networks will be connected to an omnibus or common lead from the said mid-point, said lead being referred to as 10, and the other terminals of the said interconnecting networks are alternately connected to common leads 11 and 12 supplied from respective ends of the secondary winding of the said supply transformer 13. But for the advantage of such a supply in a case which will be herein below defined, a single monophased supply may be used as well with reversed alternate connections of the terminals of successive interconnecting networks to the two leads thereof, see for instance FIG. 10.

The operation of such circuits as are shown in FIGS. 4 and 5 may be explained as follows: at the end of any "positive" alternation of the phase (1) of the voltage, leads 10 and 11 of FIG. 5, it will be assumed that cores I, III, V, . . . are in their reset or N condition and at the end of any period of the phase (3), leads 10 and 12 of FIG. 5, the cores II, IV, . . . also are in such a state of magnetization.

When the core I for instance is in its N condition at the end of a "negative" alternation of the phase (1) of the voltage supply, then, the current flowing through the read-out winding thereof during the "positive" alternation of the said phase (1) will not have any effect upon the said N condition thereof but the current, being of a higher value, will act through the write-in winding of the following core II, to bring the said core II from its N condition to its P condition, consequently reversing the stable state of magnetization thereof. When on the other hand, the core I is in its P condition at the end of a negative alternation of the supply phase (1) and the positive alternation of this phase normally follows, the read-out current will reset the said core I to the N condition thereof, the current through the interconnecting network from I to II will be of a lower value (practically zero during this resetting) and the core II will remain in the N condition thereof. When, in turn, the core II is in its N condition at the end of a positive alternation of the phase (1) of the supply voltage, consequently at the end of the negative alternation of the phase (3), the positive following alternation of the said phase (3) does not have any effect on this core II but will bring the core III to the P condition thereof. Conversely, when the core II has been brought to the P condition thereof at the end of a positive alternation of phase (1), the positive alternation of phase (3) will reset it to the N condition and the core will be left in the said N condition. It is then apparent that an information bit or digit progresses in a complete period of the A.C. supply (a pair of successive alternations thereof) from the core I to the core III with the temporary registration in one representation on the said cores, passing through a temporary registration in reverse representation on the intermediate core II; and so forth.

Assuming a value 1 is represented by the P condition on cores such as I, III, V and consequently the said value 1 is represented by the N condition on cores such as II and IV, we may consider that, at a definite time instant prior to the beginning of a phase (1) of operation of the device, core I is at P, core III is at N, core V is at P; of course cores II and IV are at N. The phase (1) in the positive alternation thereof, brings back core I to N, and core II remains at N; core III remains at N but core IV is brought at P; core V is set back to N. Then, in the following positive alternation of (3) core II remaining at N, core III is brought to P; core IV being reset at N, core V remains at N. The digital value 1 assumed to be recorded on core I at the beginning of the operation is now duly reproduced, by the same P magnetic condition, on core III. The information bit has progressed by one step. Further, the digital value 0 which was recorded at the beginning of operation on core III is now duly reproduced in the same N condition, on core V. This information bit has also progressed by one step.

Such a systematic change of representation of a digital value throughout the cascade circuit of magnetic cores of FIGS. 4 and 5 is the natural counterpart of the simplification brought to the scheme of FIG. 1. It is quite acceptable in such information handling circuits since it only results in a systematic reversal of the correspondence between the states of magnetization of the cores and the digital values 0 and 1 with respect to the locations of the cores in such a cascade circuit. When required, the normal constant representation progression may be re-established by means of additional windings fed from the voltage supply through rectifiers of same direction as those indicated above, acting upon windings of the same direction of winding as were the windings 5 and reversing the direction of action of the said windings 5 if the above-defined conventions must be preserved.

Now, each time a magnetic core has the condition thereof changed, the current stays at a constant and relatively small value, as indicated by the full line curve in the graph of FIG. 6 whereas the voltage applied across the terminals of the concerned interconnecting network varies according to the dotted line C of the same diagram. After this change of magnetization a sudden rise of current occurs as shown at A which corresponds to an overvoltage in the concerned network. This overvoltage is transferred to both the interconnecting networks attached to the cores where it is met by the voltages therein and may not be compensated for by the opposite polarity voltage of the other phase then existing in these latter interconnecting networks, and the change of which with respect to the time, is given by the curve B at the lower part of the said FIG. 6.

According to a subsidiary feature of the invention, such a drawback is overcome by the provision, see FIG. 8, of a counter-battery voltage acting in each and any interconnecting network for increasing the level of each negative alternation of the voltage supply. Actually, as shown in the graph of FIG. 7, the operative level of the A.C. supply which may be zero in the schemes of FIGS. 4 and 5, is established to a level D. This counter D.C. voltage may be either provided by placing a distinct battery in the series circuit of each interconnecting network or, with an additional and apparent advantage in a scheme according to FIG. 5, in the lead from the mid-point of the secondary winding of the supply transformer 13, as shown at 14 in FIG. 8.

In order that a common counter-battery be fully operative, it is necessary that the supply voltage applied to the primary winding of the transformer is highly regulated since the operative level D is determined by the peak voltage of the said supply. Further and from a different point of view the unidirectionally conducting elements 8 usually present a coefficient of variation of their temperature/resistance law which produces undue variations of the levels of the stray overvoltages and currents which have been herein above referred to. Further again, in a magnetic core circuit according to the invention, different numerical codes of information will be sent along the cascade arrangement of magnetic cores, and of course the counter-battery voltage will be deemed to be adjusted for the most unfavorable code configuration. A typical case of unfavorable code for the portion of circuit which is shown in the drawings is that when the core IV records the digital value 1 and the core II, the digital value 0, since in such a case both cores III and IV will simultaneously change the magnetic conditions thereof and the networks II—III and III—IV, IV—V will be coupled before the end of a thus defined switching period.

Consequently it may be of advantage to substitute for the counter-battery 14 of FIG. 8, a self-biasing network such as shown at 15 in the corresponding embodiment of FIG. 9. The result is similar to that of the provision of a counter-battery but without the above-mentioned drawbacks since the D.C. component which is thus introduced within the control voltages of the interconnecting networks has an amplitude always proportional to the average consumption of the said interconnecting networks.

For deriving from such a magnetic core circuit as herein above described signals representative of the digits progressing therethrough, an easy scheme is shown in FIG. 10 of the drawings. The interconnecting network from which such a derivation must be made is provided with an additional write-in winding 16 of a further magnetic core IX identical to any other magnetic core of the concerned circuit, as well as the normal write-in winding of the next core of the cascade which is shown at VI, the read-out core being supposed to be the core V of the preceding figures. The read-out current from the winding 5 of the core V will act in the same fashion on the two windings 6 and 16 and consequently the cores VI and IX will be identically controlled therefrom. The core IX is provided with an output winding 25 inserted in an interconnecting network also comprising a resistance 19 and a series undirectionally conducting element 18 with a write-in winding 26 of a further magnetic core VIII and it must be understood that both cores VI and VII are simultaneously read-out.

For performing certain logical operations with the aid of the circuit of FIG. 10, it suffices, as shown in FIG. 11, to provide the said additional core IX with a further input or write-in winding 35 upon which is applied a separate write-in current representing a further variable. According to the respective directions of action of both windings 16 and 35 upon the core IX, and supposing an identical intensity of action for both of them, however, it is apparent that on the core IX and from this core, through the further read-out thereof, one may obtain the result of one of the following logical combinations: union of two variables (both windings of the same positive directions of action), and inhibition of one of the variables by the other one (one of the windings in positive direction or action and the other one, in negative direction of action.)

Logical operations may further be performed according to other schemes, which are known per se and comprise combinations of several read-out windings of separate cores in series and/or shunt relation within a single interconnecting network. As some difficulties have been met with circuits according to the invention for performing such logical operations according to these further schemes, an additional improvement in this respect has been devised which is first disclosed in a plain transfer circuit in the FIG. 12 of the drawings, as presenting per se certain advantages for interconnecting two following and distinct cascade arrangements of magnetic core circuits according to the previously disclosed kind.

In FIG. 12 it is assumed that core V is the last of a first cascade arrangement of magnetic cores and that the information bit which is temporarily registered on the said core V must be transferred with the same presentation to the first core X of a further cascade arrangement of the magnetic cores, by means of an intermediary registration on a core VI. For this latter core, phase (1) will be assumed to be the write-in period and phase (3) the read-out period. The interconnecting network between cores V and VI is of the same kind as above but respective connections to the ends of the write-in winding of core VI has been shown as reversed for a purpose which will be later explained. The interconnecting network between the cores VI and X also is of the same kind as before but further includes a shunt branch, constituted by a winding of a magnetic core XI, connected between one end of the read-out winding 5 of core VI and that terminal of the phase (3) not connected to the said winding 5, so that an A.C. circuit is closed by the winding of core XI through the winding 5, for the circulation therethrough of a two-polarity component. The core XI is of a kind having a substantially rectangular hysteresis cycle. Consequently the winding 5 of core VI will be traversed by the said two-polarity component alone during any period of writing on the core VI and, in addition, by a rectified component (through 8) during any period of reading of the said core.

During any period of writing on the core VI, the said two-polarity component passing through the winding 5 thereof will produce an electro-motive force in the winding 6 of the said core VI as the direciton of connection of the element 8 in the interconnecting network between V and VI will be in the correct sense. As the ampere-turns of the said winding 6 are of a correct direction for producing a reversal of magnetization of the core VI under the action of such a backward transferred electro-motive force, the core VI will change its magnetic condition provided no current from V opposes such an action in the said interconnecting network between V and VI (the opposition of such a current, if any, is due to the reversal of connections of the winding 6 in the said interconnecting network, as shown). When the magnetic condition of V is such that a write-in current is developed within the said interconnecting network the action of the above defined electromotive force will be inhibited, in the other case, it will not be inhibited. But quite apparently for enabling the said inhibition, it is necessary that the induced current from the said electromotive force is automatically limited as concerns the amplitude thereof and that is why the shunt branch has been provided as a winding of a core XI which presents such an auto-limitation characteristic, when suitably proportioned with respect to the cores of the circuit.

In a detailed way, the operation may be explained as follows, assuming that when during a period of control for the core VI a higher value current of phase (1) circulates into the interconnecting network between V and VI, the digital value is 1, and on the other hand that this digital value is 0 when the such circulating current of phase (1) is of lower (and negligible) value. The initial condition of the core VI, representing the digital value 0, is $A_0$ and the core XI has an initial magnetic condition $B_0$ of the same character as $A_0$.

Considering that during a period of writing of the core VI the current from the read-out winding of core V is at the higher value thereof, digital value 1 of the information bit, then this current will oppose that induced in the winding 6 from the "negative" alternation of phase (3), the core VI will remain in the $A_0$ magnetic condition but the core XI will change its magnetic condition to $B_1$. Consequently during the following "positive" alternation of the said phase (3) the core VI remains in the $A_0$ magnetic condition and the core XI is reset to $B_0$. The rectified current through 8 to the core X produces a change of the magnetic condition of the said core X from $A_0$ to $A_1$, as this rectified component is of a higher and sufficient value as the impedance of the winding 5 of core VI is low during the concerned alternation of phase (3).

Considering on the other hand that during a period of writing on the core VI, the current from the read-out winding of core V is at the lower value thereof, digital value 0 of the information bit, then no opposition occurs to the action of the current induced from the negative alternation of phase (3) in the input winding 6 of core VI. This core will be brought to the $A_1$ condition thereof, and the core XI remains at its $B_0$ magnetic condition, the current limitation being due to the core VI during the change-over condition thereof. The coercive current for XI is made higher than that for VI. During the positive following alternation of phase (3), the core VI is read-out, viz. is reset to $A_0$ and the core XI remains at $B_0$. The current of the rectified component applied to the write-in winding of X is too low for acting upon the condition of this latter core which remains in the $A_0$ magnetic condition thereof.

It is apparent that in such a scheme, the consumption of current for the change-over of magnetic conditions of core VI only results from the delivery of current of the supply voltage sources, hence the security of operation enabling any combination of read-out windings for performing logical operations therefrom as herein above suggested and as it will be now explained with reference to FIGS. 13 to 16, respectively showing illustrative embodiments of such combinations, and from which any further logical combination may be derived as they show the main elementary functions, viz. union, FIG. 13, intersection, FIG. 14, union of intersections, FIG. 15 and intersection of unions, FIG. 16.

Figure 13:
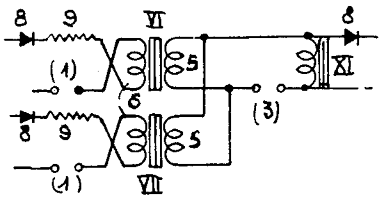

The union circuit of FIG. 13 comprises a pair of magnetic cores VI and VII, the read-out windings of which are shunt connected with respect to each other across a series interconnecting network of which the terminals (3), unidirectionally conducting element 8 and shunt branch XI are only shown, this network apparently terminating across a write-in winding of a receiving core, not shown. More than two magnetic cores may be similarly related, as apparent for a union or more than two variables. When one of the cores remains in the $A_0$ condition thereof, digital value 1 applied to the said core, the core XI coming to the $B_1$ magnetic condition thereof, the common read-out current through the rectifier element 8 will be of the higher value thereof, digital value 1. When, on the other hand, both the cores VI and VII come in their respective $A_1$ magnetic condition during a write-in period, digital value 0 for both inputs, the read-out current will be limited at the lower value thereof from the returns of both cores to their $A_0$ magnetic condition and consequently the output will represent the digital value 0 as required. The union function or logical "OR" is met as required with such a circuit arrangement. Denoting one of the variables by $x$ and the other one by $y$, the result may be written $(x+y)$ in the Boolean meaning of such an expression.

Figure 14:
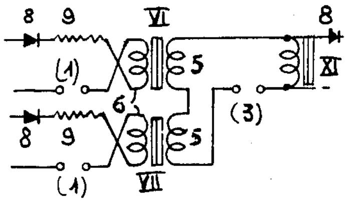

The circuit of FIG. 14 operates as an intersection network, logical product $(x.y)$. The extension thereof to more than two input variables is apparent per se. The read-out windings 5 are serially connected with respect to the phase (3) supply voltage in the output interconnecting network (to a write-in winding of a further core which is not shown in the drawing). When during a write-in period for the cores VI and VII, one of the said cores remains in the $A_0$ condition thereof but the other one comes to the $A_1$ condition thereof, the read-out current at the following normal alternation of the supply voltage will be of the lower value thereof, and consequently indicate the digital value 0 as required. But when both cores are set to $A_0$ at the end of the concerned write-in period, both digital input values being 1, the read-out current will be at the higher value thereof, consequently indicating the digital value 1 as required. When both the cores VI and VII are set to $A_1$ after a common write-in alternation, both digital input values being 0, the read-out current will be limited by both returns of the said cores to their respective $A_0$ conditions, as required. It may be noted that, when the cores VI and VII are both requested to change-over their conditions from $A_0$ towards $A_1$, the actual magnetic states $A_1$ will not be reached but an intermediary magnetic state sufficient for the further limitation of the read-out current as required.

Figure 15:
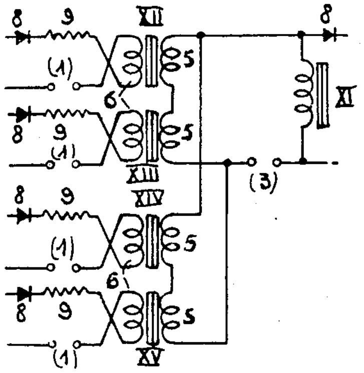

FIG. 15 shows an example of a circuit for performing a union of intersections and the operation thereof is apparent from the above. When for instance the core XII receives the variable signal $x$ and the core XIII the variable signal $\bar{y}$, where as the core XIV receives the variable signal $\bar{x}$ and the core XV, the variable signal $y$, the result signal represents the disjunction result $(x.\bar{y}+\bar{x}.y)$.

Figure 16:
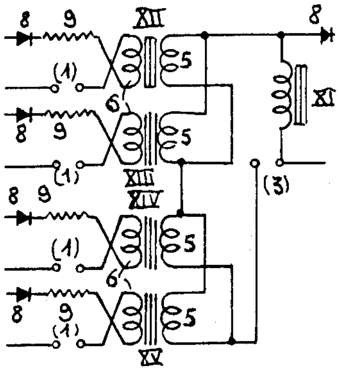

FIG. 16 shows an example of a circuit for performing an intersection of unions and the operation thereof is apparent from the above. When for instance, the core XII receives the variable signal $x$ and the core XIII the variable signal $\bar{y}$, where as the core XIV receives the variable signal $\bar{x}$ and the core XV, the variable signal $y$, then the output signal represents the result of the operation $(x+\bar{y}).(\bar{x}+y)$.

Any other logical operation between two or more input variables may be derived from the said circuits.

The arrangements shown in FIGURES 12 to 16 are being claimed in a separate copending application.

What is claimed is:

1. A device for handling binary coded information comprising at least one cascaded arrangement of magnetizable cores, each core having a substantially rectangular hysteresis cycle of magnetization and having at least one write-in winding, and at least one read-out winding thereon, the write-in winding having a smaller number of turns than the read-out winding; a series network interconnecting each pair of adjacent cores and comprising in series circuit connection a read-out winding on one core, a unidirectional conducting device, a write-in winding of an adjacent core, and a source of alternating voltage; means connecting alternate ones of said networks to receive alternating voltages of the same phase relation and the remaining networks to receive alternating voltages of opposite phase with respect to the voltages supplied to said alternate networks, and the unidirectionally conducting devices being similarly connected to conduct current in the same direction in all networks, said read-out winding when energized by current from an alternation of said alternating voltage providing sufficient magnetizing force in itself to reverse the magnetic state of its associated core from the magnetic state previously established in the core by the read-in winding of the core.

2. A device according to claim 1 and wherein the read-out and write-in windings on the said cores are wound to provide opposite directions of magnetization thereon.

3. A device according to claim 1 in which the successive networks are connected to a single alternating source with their connections reversed.

4. A device according to claim 1 in which the alternating voltage source is a center-tapped transformer winding having two outer terminals, successive networks being connected between a different outer terminal of the transformer and a common terminal connected to the center-tap.

5. A device in accordance with claim 4 in which a counter-battery is serially connected in the common terminal connected to the center-tap of the transformer winding.

6. A device in accordance with claim 4 including a self-biasing network in the common terminal connected to the center-tap of the transformer winding.

7. A device according to claim 1 including a series resistance in each one of the said interconnecting networks.

8. A device according to claim 1 and wherein a counter-battery voltage is connected in series in all the said interconnecting networks for increasing the amplitude of the inactive alternations of the said alternating control voltage therein.

9. A device according to claim 6 wherein the said self-biasing network includes a resistor and a capacitor in shunt therewith.

10. A device according to claim 1 and wherein at least two write-in windings of separate magnetic cores are provided in series in at least one of the interconnecting networks of the device.

11. A device according to claim 10 and wherein one at least of the said separate cores in the said interconnecting network is provided with a further distinct write-in winding from another information handling arrangement and with a read-out winding to an interconnecting network of the said further arrangement.

References Cited in the file of this patent

UNITED STATES PATENTS

| | | |
|---|---|---|
| 2,683,819 | Rey | July 13, 1954 |
| 2,747,110 | Jones | May 22, 1956 |
| 2,751,546 | Dimmer | June 19, 1956 |
| 2,753,545 | Liend | July 3, 1956 |
| 2,763,851 | Haynes | Sept. 18, 1956 |
| 2,851,675 | Paivinen | Sept. 9, 1958 |
| 2,873,438 | Briganski | Feb. 10, 1959 |
| 2,887,675 | Lo | May 19, 1959 |